United States Patent Office 3,433,819
Patented Mar. 18, 1969

3,433,819
HEXASUBSTITUTED-2-SILA-1,3-DIOXOLANES
Robert A. Braun, Newark, Del., assignor to E. I. du Pont de Nemours and Company, Wilmington, Del., a corporation of Delaware
No Drawing. Continuation-in-part of application Ser. No. 491,412, Sept. 29, 1965. This application Sept. 22, 1966, Ser. No. 581,183
U.S. Cl. 260—448.8                12 Claims
Int. Cl. C07f 7/02, 7/18, 7/08

ABSTRACT OF THE DISCLOSURE

Highly thermal stable hexasubstituted-2-sila-1,3-dioxolanes having the general structural formula:

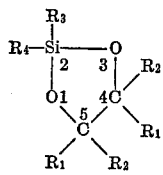

in which $R_1$ and $R_2$ are individually either a $-CF_3$, $-C_2F$, or $-CF_2Cl$ radical and $R_3$ and $R_4$ can together constitute a $C_4-C_7$ alkylene radical or individually be one of the following radicals: $C_1-C_{18}$ alkyl, $C_2-C_6$ alkenyl, $C_2-C_7$ cycloalkyl, phenyl, or a substituted phenyl having as a substituent group Cl, Br, F or $-OCH_3$, are provided for use in lubricants, heat transfer fluids and hydraulic fluids.

---

This application is a continuation-in-part of my co-pending application Ser. No. 491,412, filed Sept. 29, 1965 now abandoned.

This invention relates to a new class of cyclic silicon ethers and the preparation thereof.

The new compounds of this invention are generically termed hexasubstituted-2-sila-1,3-dioxolanes and have the structure

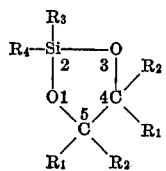

wherein $R_1$ and $R_2$ are individually either a $-CF_3$, $-C_2F$, or $-CF_2Cl$ radical and $R_3$ and $R_4$ can together constitute a $C_4-C_7$ alkylene radical or individually be one of the following radicals: $C_1-C_{18}$ alkyl, $C_2-C_6$ alkenyl, $C_3-C_7$ cycloalkyl, phenyl, or a substituted phenyl having as a substituent group Cl, Br, F, or $-OCH_3$. However, the compounds of this invention can contain only one phenyl or substituted phenyl radical.

As used in this invention, the term $C_x-C_y$ alkyl means an alkyl radical having X to Y carbon atoms, inclusive, and can be straight chain or branched. Thus, a $C_1-C_{18}$ alkyl includes methyl, ethyl, propyl, butyl, isopropyl, iso-butyl, sec-butyl, t-butyl, and so on including the higher members thereof such as pentadecyl, hexadecyl, heptadecyl, and octadecyl. Similarly, the term $C_3-C_7$ cycloalkyl includes cyclic radicals such as cyclopropyl, cycloheptyl, 2-(n-butyl)cyclopropyl, etc. The term alkylene refers to bivalent radicals such as tetramethylene, pentamethylene, hexamethylene, and heptamethylene while the term $C_2-C_6$ alkenyl is meant to include mono-ethylenically-unsaturated mono-valent radicals such as vinyl, propenyl, butenyl, hexenyl wherein the unsaturation can be anywhere in the group. Finally, it is to be understood that the substituted phenyls can have the substituent groups in either the meta, ortho, or para position.

Compounds of this invention can be readily prepared by reacting a dihalo silane with a ketone in the presence of lithium metal. The reaction can be represented as follows:

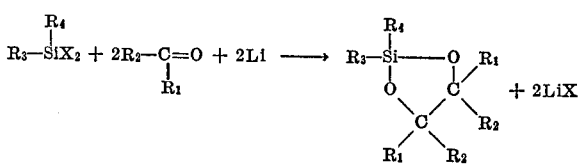

where $R_1$, $R_2$, $R_3$, and $R_4$ have the above designations and where X is Cl or Br.

The above reaction generally is carried out at a temperature or about $-30°$ C. to $100°$ C. and usually under an inert atmosphere such as nitrogen. If the reaction is carried out above $20°$ C., it is generally necessary to use a closed reaction vessel and conduct the reaction under autogenous pressure. The reaction is conveniently accomplished in a suitable solvent and is initiated by slowly adding the silane material to a mixture of the ketone and lithium. The reaction generally takes from ½ to 6 hours and the product is obtained by fractional distillation at atmospheric or reduced pressure in yields from about 15% to 90%.

As represented in the above reaction, lithium is an essential reactant. While lithium can be present in the form of "shot" or "chips," a uniform and fast reaction is best obtained by using a lithium dispersion in a wax such as paraffin. Solvents generally useful in the reaction are low boiling (i.e., less than $100°$ C.) ethers such as dimethyl ether, diethyl ether, 1,2-dimethoxyethane and tetrahydrofuran.

The following examples illustrate the preparation of compounds of this invention. All the reactions are carried out in a glass vessel with a Dry Ice cooled condenser and under an inert atmosphere of nitrogen.

EXAMPLE I

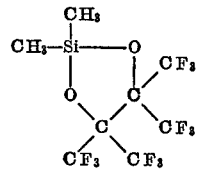

2,2-dimethyl-4,4,5,5-tetrakis(trifluoromethyl) 2-sila-1,3-dioxolane

Dimethyldichlorosilane (64.4 g., 0.5 mole) is added to a continuously stirred mixture of a lithium dispersion in paraffin wax (36% Li in wax with 19.4 g. Li, 1.0 mole Li), hexafluoroacetone (166.0 g., 1.0 mole) and anhydrous 1,2-dimethoxyethane over a period of one hour at a temperature of $-20°$ C. to $-10°$ C. The mixture is stirred for two hours without external cooling, subsequent to which the mixture is filtered to remove the lithium chloride precipitate. The filtrate is distilled at atmospheric pressure to remove the solvent and the product collected as a colorless liquid (B.P. $148°$ C.–$149°$ C./760 mm., $n_D^{25}$ 1.3342, in 80% yield). Infrared and nuclear magnetic resonance (N.M.R.) spectral analysis show the product to have the above structure for 2,2-dimethyl-4,4,5,5-tetrakis(trifluoromethyl)-2-sila-1,3-dioxolane.

*Analysis.*—Calc. for $C_8H_6F_{12}SiO_2$: C, 24.62; H, 1.55; Si, 7.19; F, 58.43. Found: C, 25.19; H, 1.89; Si, 6.69; F, 58.13.

EXAMPLE II

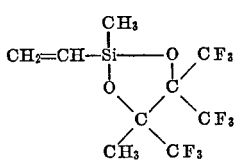

2-vinyl-2-methyl-4,4,5,5-tetrakis(trifluoromethyl)-
2-sila-1,3-dioxolane

Hexafluoroacetone (170.0 g., 1.02 moles) is added to a continuously stirred mixture of a lithium dispersion in paraffin wax (36% Li in wax with 19.48 g. Li, 1.0 mole Li) and 300 ml. of tetrahydrofuran using external cooling to maintain a temperature of −10° C. to 15° C. Subsequently, while maintaining the above temperature, vinyl methyl dichlorosilane (70.5 g., 0.5 mole) is added to the mixture over a 1 hour period with continuous stirring and stirring is continued for 2 additional hours. Lithium chloride, which precipitates is filtered off and the solvent removed at 25° C./10 mm. pressure. The crude product is distilled to give a colorless oil (B.P. 73° C.–75° C./0.5 mm, $n_D^{25}$ 1.3541 in 17.9% yield). Infrared and N.M.R. spectral analysis show that the product has the above structure for 2-vinyl-2-methyl-4,4,5,5-tetrakis(trifluoromethyl)-2-sila-1,3-dioxolane.

*Analysis.*—Calc. for $C_9H_6F_{12}O_2Si$: F, 56.68; Si, 6.98. Found: F, 56.56; Si, 6.67.

EXAMPLE III

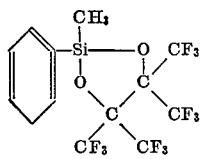

2-methyl-2-phenyl-4,4,5,5-tetrakis(trifluoromethyl)-
2-sila-1,3-dioxolane

Hexafluoroacetone (83.0 g., 0.5 mole) is added to a continuously stirred mixture of a lithium dispersion in paraffin wax (36% Li in wax with 19.4 g. Li, 1.0 mole Li) and 250 ml. of tetrahydrofuran using external cooling to maintain a temperature of −10° C. to 15° C. Subsequently, while maintaining the above temperature, methyl phenyl dichlorosilane (47.8 g., 0.25 mole) is added to the mixture over a 1 hour period with continuous stirring and stirring is continued for 2 additional hours. Lithium chloride, which precipitates, is filtered off and the solvent is removed at 25° C./10 mm. pressure. The crude product is fractionated to give a colorless oil (B.P. 105° C./2.7 mm. (207° C./760 mm.), $n_D^{25}$ 1.4007 in 53.8% yield). Infrared and N.M.R. spectral analysis show the product to have the above structure for 2-methyl-2-phenyl-4,4,5,5-tetrakis(trifluoromethyl)-2-sila-1,3-dioxolane.

*Analysis.*—Calc. for $C_{13}H_8F_{12}O_2Si$: C, 34.52; H, 1.78; F, 50.41; Si, 6.21. Found: C, 34.80; H, 2.01; F, 50.55; Si, 6.35.

EXAMPLE IV

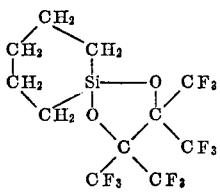

2,2,3,3-tetrakis(trifluoromethyl)-1,4-dioxa-5-
silaspiro(4.5)decane

Hexafluoroacetone (83.0 g., 0.5 mole) is added to a continuously stirred mixture of a lithium dispersion in paraffin wax (36% Li in wax with 10.0 g. Li, 0.5 mole Li) and 250 ml. tetrahydrofuran using external cooling to maintain a temperature of 0° C. to 20° C. Subsequently, while maintaining the above temperature, a solution of cyclopentamethylene silane dichloride (39.0 g., 0.25 mole) in 50 ml. of tetrahydrofuran is added over a 1 hour period with continuous stirring which is continued 2 additional hours. Lithium chloride, which precipitates, is filtered off and the filtrate is stripped at 10 mm. and the residue is fractionated to give a colorless oil (B.P. 55°–56° C./0.18 mm., $n_D^{25}$ 1.3706 in 49.4% yield). Infrared and N.M.R. spectral analysis show the product to be 2,2,3,3-tetrakis(trifluoromethyl)-1,4-dioxa-5-silaspiro(4.5)decane.

*Analysis.*—Calc. for $C_{10}H_8F_{12}O_2Si$: C, 30.71; H, 2.34; F, 52.99; Si, 6.53. Found: C, 31.03; H, 2.56; F, 52.88; Si, 6.49.

Other compounds of this invention are prepared by procedures similar to those given in the examples. As is evident from the above-presented reaction formula the structure of the desired product is determined by the selection of the particular dihalo silane and ketone reactants. Other exemplary compounds of this invention are:

2,2-dimethyl-4,4,5,5-tetrakis(pentafluoroethyl)-2-sila-1,3-dioxolane;
2,2-dimethyl-4,4,5,5-tetrakis(difluorochloromethyl)-2-sila-1,3-dioxolane;
2,2-dimethyl-4,5-bis(trifluoromethyl)-4,5-bis(pentafluoroethyl)-2-sila-1,3-dioxolane;
2,2-dimethyl-4,5-bis(trifluoromethyl)-4,5-bis(difluorochloromethyl)-2-sila-1,3-dioxolane;
2,2-dimethyl-4,5-bis(pentafluoroethyl)-4,5-bis(difluorochloromethyl)-2-sila-1,3-dioxolane;
2-vinyl-2-methyl-4,4,5,5-tetrakis(pentafluoroethyl)-2-sila-1,3-dioxolane;
2-vinyl-2-methyl-4,5-bis(trifluoromethyl)-4,5-bis(difluorochloromethyl)-2-sila-1,3-dioxolane;
2-methyl-2-phenyl-4,4,5,5-tetrakis(difluorochloromethyl)-2-sila-1,3-dioxolane;
2-methyl-2-phenyl-4,5,-bis(pentafluoroethyl)-4,5-bis(difluorochloromethyl)-2-sila-1,3-dioxolane;
2,2,3,3-tetrakis(pentafluoroethyl)-1,4-dioxa-5-silaspiro(4.5)decane;
2,3-bis(pentafluoroethyl)-2,3-bis(difluorochloromethyl)-1,4-dioxa-5-silaspiro(4.5)decane;
2,2-didodecyl-4,4,5,5-tetrakis(trifluoromethyl)-2-sila-1,3-dioxolane;
2-phenyl-2-tridecyl-4,4,5,5-tetrakis(trifluoromethyl)-2-sila-1,3-dioxolane;
2-cyclopropyl-2-octyl-4,4,5,5-tetrakis(trifluoromethyl)-2-sila-1,3-dioxolane;
2,2-dioctadecyl-4,4,5,5-tetrakis(trifluoromethyl)-2-sila-1,3-dioxolane;
2,2-dioctadecyl-4,5-bis(trifluoromethyl)-4,5-bis(pentafluoroethyl)-2-sila-1,3-dioxolane;
2,2-dioctadecyl-4,4,5,5-tetrakis(difluorochloromethyl)-2-sila-1,3,-dioxolane;
2-ethyl-2-isobutyl-4,4,5,5-tetrakis(trifluoromethyl)-2-sila-1,3-dioxolane;
2,2-dicyclopropyl-4,4,5-5-tetrakis(trifluoromethyl)-2-sila-1,3-dioxolane;
2,2-dicycloheptyl-4,4,5,5-tetrakis(trifluoromethyl)-2-sila-1,3-dioxolane;
2,2-di[2-(n-butyl)cyclopropyl]-4,5-bis(trifluoromethyl)-4,5-bis(pentafluoroethyl)-2-sila-1,3-dioxolane;
2,2-dicyclopentyl-4,4,5,5-tetrakis(difluorochloromethyl)-2-sila-1,3-dioxolane;
2-(p-chlorophenyl)-2-ethyl-4,4,5,5-tetrakis(trifluoromethyl)-2-sila-1,3-dioxolane;
2-(m-bromophenyl)-2-cyclopropyl-4,5-bis(trifluoromethyl)-4,5-bis(pentafluoroethyl)-2-sila-1,3-dioxolane;
2-(o-methoxyphenyl)-2-vinyl-4,4,5,5-tetrakis(difluorochloromethyl)-2-sila-1,3-dioxolane;
2-diallyl-4,4,5,5-tetrakis(trifluoromethyl)-2-sila-1,3-dioxolane;

2-crotyl-2-cyclopropyl-4,5-bis(trifluoromethyl)-4,5-bis (pentafluoroethyl)-2-sila-1,3-dioxolane;
2-di(2-hexenyl)-4,4,5,5-tetrakis(difluorochloromethyl)-2-sila-1,3-dioxolane;
2,2,3,3-tetrakis(trifluoromethyl)-1,4-dioxa-5-silaspiro(4.4)nonane;
2,2,3,3-tetrakis(trifluoromethyl)-1,4-dioxa-5-silaspiro(4.7)dodecane.

The compounds of this invention possess unexpectedly high thermal stability, especially in the presence of oxidizable metals such as iron and copper. Thus, the compounds of this invention can be used in high temperature processes for such applications as lubricants, heat transfer fluids, and hydraulic fluids.

Exemplary of the exceptional properties of these hexasubstituted-2-sila-1,3-dioxolanes are those possessed by the product of Example I. This compound is insoluble in water, nonflammable, and not reactive with boiling water, aqueous acids, and concentrated sulfuric acid. The high thermal stability of 2,2-dimethyl-4,4,4,5,5-tetrakis(trifluoromethyl)-2-sila-1,3-dioxolane was demonstrated by heating the compound in a steel "bomb" for 24 hours at 350° C. and observing that there was no color change, weight loss, or change in infrared spectral analysis results.

Additionally, those compounds of this invention that contain an ethylenically unsaturated bond can be homo and copolymerized to provide highly fluorinated polymers. In particular, when such compounds are polymerized with the usual coating composition monomers (e.g., styrene, acrylonitrile, acrylates, methacrylates, etc.), a coating composition with exceptional durability and low coefficient of friction can be provided.

What is claimed is:

1. A compound having the structure

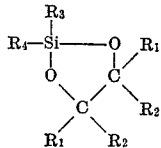

wherein:

$R_1$ and $R_2$ are individually selected from $-CF_3$, $-C_2F_5$, and $-CF_2Cl$ and $R_3$ and $R_4$ are together a $C_4-C_7$ alkylene radical or each a radical individually selected from $C_1-C_{18}$ alkyl, $C_2-C_6$ alkenyl, $C_3-C_7$ cycloalkyl, phenyl, and phenyl having a Cl, Br, F, or $-O-CH_3$ substituent group, only one phenyl radical or substituted phenyl radical can be present.

2. The compound of claim 1 wherein $R_1$ and $R_2$ are the same.

3. The compound of claim 2 wherein $R_1$ and $R_2$ are $-CF_3$.

4. The compound of claim 1 wherein $R_3$ and $R_4$ are together a $C_4-C_7$ alkylene radical or individually selected from $C_1-C_{12}$ alkyl, $C_2-C_3$ alkenyl, and phenyl.

5. The compound of claim 4 wherein $R_1$ and $R_2$ are the same.

6. The compound of claim 5 wherein $R_1$ and $R_2$ are $-CF_3$.

7. The compound of claim 5 wherein $R_3$ and $R_4$ are methyl.

8. The compound of claim 5 wherein $R_3$ is methyl and $R_4$ is vinyl.

9. The compound of claim 5 wherein $R_3$ is methyl and $R_4$ is phenyl.

10. The compound of claim 5 wherein $R_3$ and $R_4$ together are a cyclopentamethylene radical.

11. The compound of claim 7 wherein $R_1$ and $R_2$ are $-CF_3$.

12. A process for preparing the compound of claim 1 comprising reacting in the presence of lithium metal and at a temperature of $-30°$ C. to $100°$ C., a dihalo silane having the structure

with an acetone having the structure

wherein X is Cl or Br and $R_1$, $R_2$, $R_3$, and $R_4$ are as given in claim 1.

References Cited
UNITED STATES PATENTS

| | | | |
|---|---|---|---|
| 2,832,794 | 4/1958 | Gordon | 260—448.2 |
| 2,875,172 | 2/1959 | Caprino | 260—37 XR |
| 3,188,336 | 6/1965 | Haszeldine | 260—448.2 |
| 3,328,340 | 6/1967 | Vaughn | 260—37 X R |

FOREIGN PATENTS 791,169   2/1958   Great Britain.

TOBIAS E. LEVOW, *Primary Examiner.*

J. P. PODGORSKI, *Assistant Examiner.*

U.S. Cl. X.R.

260—46.5, 827; 252—49.6, 78